US006956861B2

(12) United States Patent
Reed et al.

(10) Patent No.: US 6,956,861 B2
(45) Date of Patent: Oct. 18, 2005

(54) CONTROLLED SHARED MEMORY SMART SWITCH SYSTEM

(75) Inventors: Coke Reed, Princeton, NJ (US); David Murphy, Austin, TX (US)

(73) Assignee: Interactics Holdings, LLC, NJ (US)

( * ) Notice: Subject to any disclaimer, the term of this patent is extended or adjusted under 35 U.S.C. 154(b) by 72 days.

(21) Appl. No.: 10/123,382

(22) Filed: Apr. 16, 2002

(65) Prior Publication Data

US 2003/0193943 A1 Oct. 16, 2003

(51) Int. Cl.[7] .............................................. H04L 12/28
(52) U.S. Cl. ...................................... 370/412; 370/429
(58) Field of Search ................................ 370/230–236, 370/255–258, 401–402, 328, 338, 409–429

(56) References Cited

U.S. PATENT DOCUMENTS

| | | | | |
|---|---|---|---|---|
| 5,592,476 A | * | 1/1997 | Calamvokis et al. | ....... 370/390 |
| 5,790,545 A | * | 8/1998 | Holt et al. | .................. 370/398 |
| 5,956,340 A | | 9/1999 | Afek et al. | |
| 5,983,260 A | * | 11/1999 | Hauser et al. | .............. 709/201 |
| 6,055,599 A | * | 4/2000 | Han et al. | .................... 710/317 |
| 6,072,772 A | | 6/2000 | Charny et al. | |
| 6,122,251 A | | 9/2000 | Shinohara | |
| 6,141,346 A | * | 10/2000 | Caldara et al. | ............. 370/390 |
| 6,144,635 A | * | 11/2000 | Nakagawa | .................. 370/229 |
| 6,236,655 B1 | * | 5/2001 | Caldara et al. | ........ 370/395.31 |
| 6,314,487 B1 | * | 11/2001 | Hahn et al. | .................. 710/317 |
| 6,343,346 B1 | * | 1/2002 | Olnowich | .................... 711/142 |
| 6,477,174 B1 | * | 11/2002 | Dooley et al. | .............. 370/416 |
| 6,557,070 B1 | * | 4/2003 | Noel, Jr. | ..................... 710/317 |
| 6,563,831 B1 | | 5/2003 | Dally et al. | |
| 6,580,692 B1 | * | 6/2003 | Francis et al. | ............. 370/248 |
| 6,639,920 B2 | * | 10/2003 | Sakurai et al. | .............. 370/471 |

* cited by examiner

Primary Examiner—Zahn Maung
Assistant Examiner—Van Nguyen
(74) Attorney, Agent, or Firm—Dickstein, Shaprio, Morin & Oshinsky, LLP.

(57) ABSTRACT

An interconnect structure comprising a plurality of input ports and a plurality of output ports with messages being sent from an input port to a predetermined output port through a switch S. Advantageously, the setting of switch S is not dependent upon the predetermined output port to which a particular message is being sent.

6 Claims, 9 Drawing Sheets

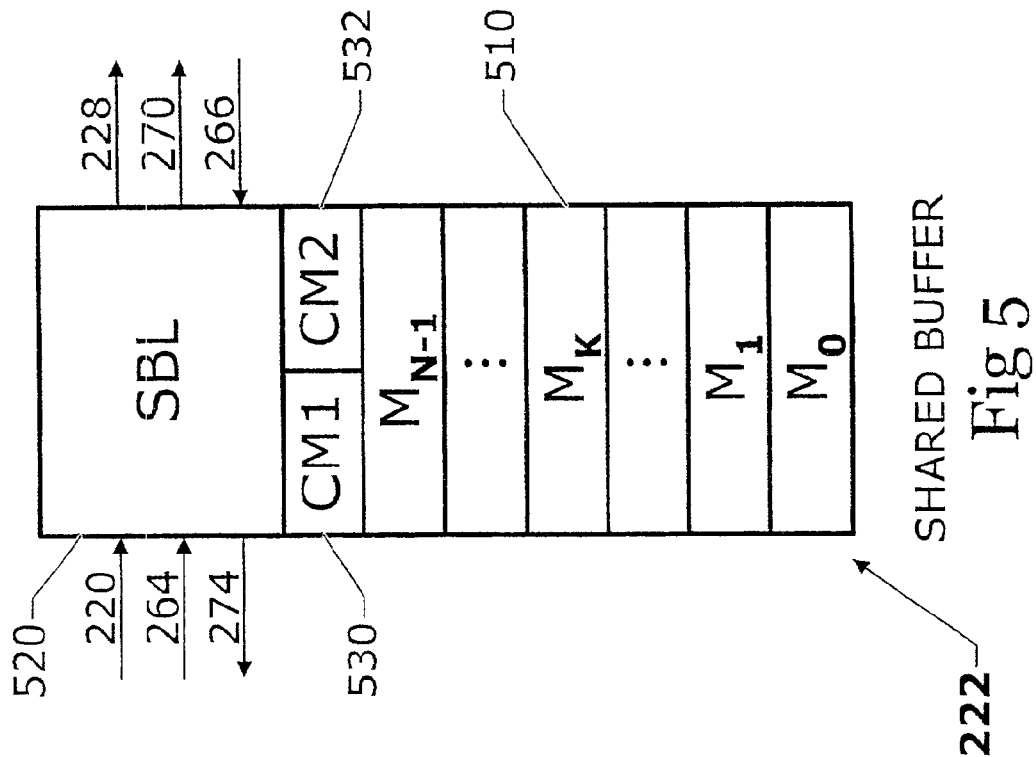
Fig 5 SHARED BUFFER
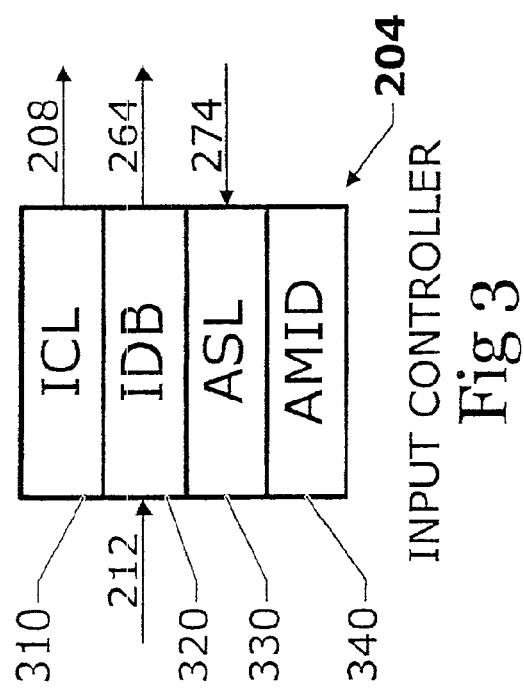
Fig 3 INPUT CONTROLLER
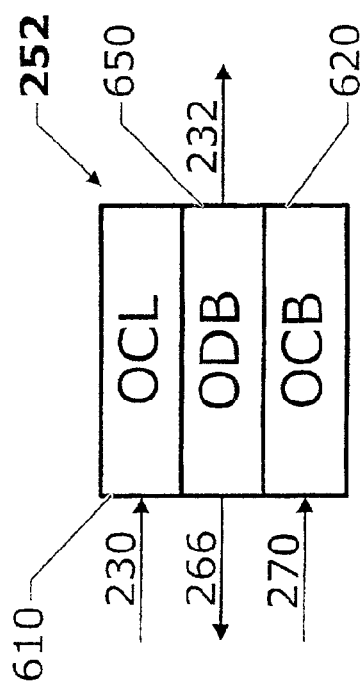
Fig 6 OUTPUT CONTROLLER

MESSAGE PACKET / SEGMENT / FLIT

CONTROL INFORMATIONPACKET (CIP)

OUTPUT CONTROLLER PACKET (OCP)

MEMORY LOCATION AVAILABLE PACKET (MLA)

DELETE MESSAGE PACKET (DM)

CHANGE MESSAGE PACKET PRIORITY (CP)

OUTPUT PORT STATUS (OPS)

CONTROLLED SHARED MEMORY SMART SWITCH SYSTEM

RELATED PATENT AND PATENT APPLICATIONS

The disclosed system and operating method are related to subject matter disclosed in the following patents and patent applications that are incorporated by reference herein in their entirety:

1. U.S. Pat. No. 5,996,020 entitled, "A Multiple Level Minimum Logic Network", naming Coke S. Reed as inventor;
2. U.S. Pat. No. 6,289,021 entitled, "A Scaleable Low Latency Switch for Usage in an Interconnect Structure", naming John Hesse as inventor;
3. U.S. patent application Ser. No. 09/693,359 entitled, "Multiple Path Wormhole Interconnect", naming John Hesse as inventor;
4. U.S. patent application Ser. No. 09/693,357 entitled, "Scalable Wormhole-Routing Concentrator", naming John Hesse and Coke Reed as inventors;
5. U.S. patent application Ser. No. 09/693,603 entitled, "Scaleable Interconnect Structure for Parallel Computing and Parallel Memory Access", naming John Hesse and Coke Reed as inventors;
6. U.S. patent application Ser. No. 09/693,358 entitled, "Scalable Interconnect Structure Utilizing Quality-Of-Service Handling", naming Coke Reed and John Hesse as inventors;
7. U.S. patent application Ser. No. 09/692,073 entitled, "Scalable Method and Apparatus for Increasing Throughput in Multiple Level Minimum Logic Networks Using a Plurality of Control Lines", naming Coke Reed and John Hesse as inventors; and
8. U.S. patent application Ser. No. 09/919,467 entitled, "Means and Apparatus for a Scaleable Congestion Free Switching System with Intelligent Control", naming John Hesse and Coke Reed as inventors.

FIELD OF THE INVENTION

The present invention relates to a method and means of controlling an interconnect structure applicable to voice and video communication systems and to data/Internet connections. More particularly, the present invention is directed to a shared memory interconnect switch technology with intelligent control.

BACKGROUND OF THE INVENTION

A simple data packet switching system found in the prior art consists of a N×N switch fabric S (often a crossbar) connecting N input ports $I_0, I_1, \ldots I_{N-1}$ to N output ports $O_0, O_1, \ldots O_{N-1}$. In a common configuration, illustrated in FIG. 1, there are buffers $IB_0, IB_1, \ldots IB_{N-1}$ 102 at the inputs that hold packets waiting to enter the crossbar switch 104. In some configurations, there may also be output buffers $OB_0, \ldots OB_{N-1}$ 106. Additionally, there is some logic (not pictured) to control the crossbar.

In one simple embodiment, with N input ports, there is a round robin method of controlling the switch. The round robin procedure first permutes the integers $0, 1, \ldots N-1$ into a sequence $P(0), P(1), \ldots P(N-1)$. Then, the logic that sets the N×N switch first examines the data packets at the input port buffer $IB_{P(0)}$ and selects a packet $p_0$ that it most desires to send through the switch. If the target output port or target output port buffer is able to receive a packet, then the logic sets the switch connection to send $p_0$ to its target. If the target output of $p_0$ is not in a condition to receive $p_0$, then the logic attempts to send another packet $p_1$ in $IB_{P(0)}$ to its target. This process is continued until either: 1) A packet $p_n$ in $IB_{P(0)}$ is found that can be sent to its target; or 2) No such packet is found. In case 1, one crossbar connection is set. In case 2, no message from $IB_{P(0)}$ will be sent in the next message sending period. At this point, the logic sets the switch to send a packet in $IB_{P(1)}$ through the switch. For a packet q to be sent from $IB_{P(1)}$ to it's target, it is necessary that the target is in a condition ready to receive a message, and moreover, it is necessary that p and q are not sent to the same output. In general, this process is continued subject to the constraint that no packet in a buffer $IB_{P(K)}$ is sent to an output already scheduled to receive a packet from $IB_{P(J)}$, where J<K. Once the switch is completely set, then the packets are sent and the procedure is repeated with a new permutation $Q(0), Q(1), \ldots Q(N-1)$. The reason for the new permutation is that the early members of the sequence have an advantage over the later members and in order to be fair, it is necessary that the integers be rearranged for each setting of the switch.

There are a number of disadvantages to the message management scheme of the prior art: 1) the setting of the switch is time consuming; 2) the setting of the switch is not optimal; 3) no two output ports can simultaneously receive distinct messages from the same input port. One example where the setting is not optimal is in the case where a low priority message in $IB_{P(J)}$ blocks a high priority message in $IB_{P(K)}$, where J<K. While there are numerous variations to shared memory switching systems, the same three problems persist with each of the variations. An example of a system that overcomes disadvantages 1 and 3 is described in "A Multiple Level Minimum Logic Network" (MLML network) is described in U.S. Pat. No. 5,996,020, granted to Coke S. Reed on Nov. 30, 1999, ("Invention #1"), the teachings of which are incorporated herein by reference. Another example of a system overcoming disadvantages 1 and 3 is described in U.S. patent application Ser. No. 09/009,703 filed by John Hesse on Jan. 20, 1998. ("Invention #2" entitled: "A Scaleable Low Latency Switch for Usage in an Interconnect Structure"). Disadvantage 2 is overcome in the system described in U.S. patent application Ser. No. 09/919,467 entitled, "Means and Apparatus for a Scaleable Congestion Free Switching System with Intelligent Control" (Invention #8). This system uses interconnect structures of the type described in Inventions #1 and #2. A key idea in Invention #8 is to control packet entry into the data switch by jointly considering all of the messages targeted for a common output port.

It is the purpose of the present invention to use novel new techniques to overcome disadvantages 1, 2, and 3. These techniques use a key idea of Invention #8, of establishing control of the system based on comparing messages targeted for a common output port. However, the present invention does not require the use of self routing networks but rather relies on a novel new data management technique. The present invention shows how to manage shared memory switching systems effectively.

SUMMARY OF THE INVENTION

Refer to FIG. 2 which is a schematic diagram of one embodiment of the present invention. The data entering the system is fed through a first N×N switch S1 which spreads a single data segment into banks of shared memory buffers. The data is then sent from these buffers through a second N×N switch S2 that sends the data to the output data buffers.

It will be shown later in this patent that the spreading out of the data in a certain way makes it possible to have a good strategy for choosing which messages to send through the switch S2. Moreover, the switches S1 and S2 switch in a systematic fashion governed by a clock so that there is no time consuming data dependent method of setting the switches S1 and S2.

In the following discussion, sequences of N items, such as controllers or buffers, will be used. These items will be labeled using the integers 0, 1, 2, . . . N−1, so that one of these sequences would be denoted by $X_0, X_1, X_2, \ldots X_{N-1}$. At times it will be convenient to talk about $X_{J+K}$ or $X_{J-K}$, where each of J and K is an integer in the range 0 to N−1. Since "J+K" and "J−K" must also lie in the range 0 to N−1, modulo N (mod N) arithmetic will be used. Thus, when "J+K" or "J−K" is used as a subscript, it will be understood that "J+K" is shorthand for (J+K+N)mod N and "J−K" is shorthand for (J−K+N)mod N. For example, if N=8, J=5 and K=7, then (J+K+N)mod N=(5+7+8)mod 8=4 and (J−K+N) mod N=(5−7+8)mod 8=6.

Each of the N inputs feeds into a line card 202 that prepares the data for entry into the switching system. The line card sends the data through data lines 212 to the input controllers $IC_0, IC_1, \ldots, IC_{N-1}$ 204. The input controllers break the packets into segments of length SL bits and then further break the segments into N sub-segments (flits) each of length FL bits. FL and SL are chosen so that SL=N·FL and these two values are optimized with respect to the size of the switching system and the size of the packets that it handles. The input controllers contain logic and memory buffers (not shown in FIG. 2). The input controllers perform a number of functions. They send the flits through lines 208 to S1 210. Data passes from S1 through lines 220 to the shared buffers $SB_0, SB_1, \ldots SB_{N-1}$ 222. A given input controller stores data in all of the shared buffers. In fact, each segment is composed of N flits (denoted by $F_0, F_1, \ldots F_{N-1}$) and for a given message segment, an input controller places one flit in each of the shared buffers. FIG. 2 shows grey areas 234 where the flits of a message segment are stored in the same relative location in each of the shared buffers. Data passes from the shared buffers to switch S2 224 through lines 228. Data then proceeds from S2 to the output controllers 252 through lines 230. Finally, data passes from the output controllers to the line cards 202 through the interconnect lines 232.

The switches S1 and S2 operate in a systematic manner. In this simplest embodiment, it is assumed that S1 and S2 are crossbar switches. Data can move bit serially or in wider paths. In the simple embodiment described here, data moves bit serially. A time unit T is defined as the number of clock ticks that it takes to set the switch S1 and then to move a flit consisting of FL bits from an input controller to a shared buffer through line 208, switch S1 and line 220. The system is designed so that it also takes T clock ticks to set the switch S2 and then to move a flit from a shared buffer to an output data buffer through line 228, switch S2 and line 230. A message segment cycle is composed of N time intervals, each of length T, and will be identified by [0, T], [T, 2·T], . . . [(N−1)·T, N·T]. Negative coefficients for T, such as [−T, 0], will be used to denote time intervals in the cycle previous to the one being discussed. Suppose that a message segment M is at input controller $IC_K$, then during time interval [0, T], S1 is at a setting so that the input controller $IC_K$ sends the first flit of data through the switch S1 to the Kth shared buffer $SB_K$. During time interval [T, 2·T], S1 is at a setting so that $IC_K$ sends the second flit of data through S1 to shared buffer $SB_{K+1}$. This process continues through time interval [(N−1)·T, N·T], in which $IC_K$ sends the Nth and last flit of the message segment M to shared buffer $SB_{K+(N-1)}$. At the end of this message segment cycle, each of the shared buffers contains FL bits (one flit) of the message segment M.

The movement of the data from one location to another is summarized in the Table 1 timing chart. This timing chart also shows the movement of certain control signals including those control signals discussed in the next paragraph. The timing chart of Table 1 summarizes data and control signal movement described in a number of sections of this patent.

In addition to sending the message segment M to the shared buffers, the input controller $IC_K$ also sends control information. Whereas $IC_K$ sends data bits in each of the time intervals [0, T], [T, 2·T], . . . [(N−1)·T, N·T], the input controller $IC_K$ sends a control information packet (CIP) to $SB_K$ only in the time interval [−T, 0] (which is used to denote the last interval, [(N−1)·T, N·T], of the previous cycle). The packet CIP passes from $IC_K$ to $SB_K$ through line 264. This control information packet contains information concerning the message segment M including: 1) the relative memory location of the flits of M in the shared buffers; 2) the target output of M; 3) the priority of M; 4) a unique message identifier; and 5) an end of message flag. The control information is located in a special reserved location in memory buffer $SB_K$.

The input controllers direct the writing of data to the shared buffers. The output controllers direct the reading of data from the shared buffers. Both the input controllers and the output controllers send control information to and receive control information from the shared buffers. The amount of time N·T that it takes to write a complete message segment to the shared buffers is referred to as a cycle time or as a segment insertion cycle time or simply as a cycle. A message segment writing period is referred to as a cycle period. A message segment writing period is divided into the N time intervals [0, T], [T, 2·T], . . . [(N−1)·T, N·T].

A set of lines used for passing control information from an input controller to an output controller or from an output controller to an input controller will be referred to as a "control path" and consists of the following: 1) a set of lines connecting each input controller to its corresponding shared buffer, 2) a set of lines for communicating within the shared buffer system, and 3) a set of lines connecting each output controller to its corresponding shared buffer. Importantly, note that a control path does not pass through either of the switches S1 or S2. Two control paths are present in FIG. 2: a control path consisting of lines 264, lines 260 and lines 270 that allow an input controller $IC_K$ to send control information to an output controller $OC_J$, and a control path consisting of lines 266, lines 262 and lines 274 that allow an output controller $OC_J$ to send control information to an input controller $IC_K$. A packet P originating in input controller $IC_L$ or in output controller $OC_L$ will be said to "propagate" or "percolate" through the shared buffer system if there is a sequence of consecutive time intervals $I_0, I_1, \ldots I_{N-1}$, such that P is in $SB_{L+M}$ at the beginning of time interval $I_M$, where M is an integer in the range 0 to N−1. Note that each input controller $IC_M$ or output controller $OC_M$ is in position to read packet P during time interval $I_{M-L}$ since P is in $SB_M$ at the beginning of this interval. All control information percolates through the shared buffer system.

During the time interval [−T, 0], input controller $IC_K$ sends a control information packet CIP associated with message segment M through line 264 into $SB_K$. During the time interval [0, T], this control information packet is sent from $SB_K$ to $SB_{K+1}$ and also from $SB_K$ to $OC_K$. During the time interval [T, 2·T], this same control information packet is sent from $SB_{K+L}$ to $SB_{K+2}$ and also from $SB_{K+1}$ to $OC_{K+1}$. This process continues throughout the cycle so that at the end of the cycle, each output controller has read the control information packet associated with message M. A control information packet travels from a shared buffer to an output controller through line 270. When an output controller $OC_J$ reads a control information packet for a message segment packet targeted for output port J, the output controller stores this information in its output control buffer $OCB_J$. In the present embodiment, output controller $OC_J$ discards information concerning messages targeted for output ports distinct from J. In this manner, each output controller $OC_J$ is able to keep track of the location and priority of all messages targeted for output port J. An output controller $OC_J$ is able to tell which input port a given segment entered based on the time interval in which it extracts the control information packet CIP for that segment from the shared buffer $SB_J$. Thus, for example, $OC_J$ calculates that the CIP read from $SB_J$ in the third time interval [2·T, 3·T] was originally loaded into $SB_{J-2}$ by $IC_{J-2}$ in time interval [−T, 0]; i.e. K=J−2. Hence, the control information packet CIP advantageously need not include input port information.

The output controller $OC_J$ examines a CIP for each segment inserted into the shared buffers. If there is a message segment in the shared buffers targeted for output port J and $OC_J$ has examined its CIP, then at a time interval [0, T], $OC_J$ begins to transfer one of these message segments to its output data buffer $ODB_J$. The output controller is able to make a reasonable decision as to which message to read, choosing higher priority messages over lower priority messages. During time [0, T], $OC_J$ directs a flit $F_P$ of a message sent by $IC_K$ from shared buffer $SB_J$ to its output data buffer $ODB_J$ 650. Notice that $IC_K$ places flit $F_P$ in shared buffer $SB_{K+P}$ and therefore, J=K+P and P=J−K. But output controller $OC_J$ can calculate the value of K because $OC_J$ previously read the control packet inserted in $SB_K$ by $IC_K$. Therefore $OC_J$ can calculate the value of P. Thus the packet segment is read out in the order $F_P$, $F_{P+1}$, ..., $F_{N-1}$, $F_0$, $F_1$, ..., $F_{P-1}$. It is one of the tasks of the output controller $OC_J$ to place the flits of the segment in the proper order.

In time interval [−T, 0], $OC_J$ sends a special memory location available packet MLA through line 266 to $SB_J$ indicating that the address specified in MLA will be available at the end of the current segment reading cycle. The information in MLA is a complete description of the physical location of a flit in a shared buffer, giving both its input port number and its relative storage address SA. For example, port number K and relative address SA would indicate that the flits of a segment were placed in the set of shared buffers at relative address SA within the set of flit memory banks $M_K$. At time interval [(K−J)·T, (K−J+1)·T], $IC_K$ reads this MLA packet from $SB_K$ indicating that address SA will be available for another message (MLA is moved from buffer to buffer in the shared buffer system in a manner similar to CIP as described above). If the port specified is K, then $IC_K$ adds the location SA to its list of free memory locations; otherwise, $IC_K$ ignores MLA.

The input controllers are responsible for discarding message packets when an overflow condition is imminent. Such conditions could arise if more than one input controller sends multiple high priority message packets to an output port J, while $IC_K$ also sends multiple lower priority message packets to J. Various schemes of handling overflow conditions are possible. Further discussion of this topic will be included in the section on the input controller.

The present invention has a novel scheme of directing message sub-segments into the correct physical data storage locations within the shared buffer. The storage address is sent by a separate channel and arrives before the message so that the switches internal to the shared buffer that direct data from S1 into the proper storage location are set just in time for the arrival of the message. Similarly, the address of the sub-segment to be output from the shared buffer into the switch S2 arrives just in time to direct the proper data sub-segment into S2. Neither header information nor control information pass through S1 or S2, whereas all of the data passes through both switches. The separate movement of the addresses and control information in the shared buffer is important and advantageous since each segment is decomposed into N sub-segments (flits) and placing the identical header in front of each of the messages would be time consuming.

BRIEF DESCRIPTION OF THE DRAWINGS

FIG. 3 is a schematic block diagram illustrating an input controller used in the present invention.

FIG. 5 is a schematic block diagram of a shared buffer of the present invention.

FIG. 6 is a schematic block diagram of an output controller used in the present invention.

DETAILED DESCRIPTION

In order to understand the operation of the system 200, it is necessary to have in depth knowledge of the operation of the input controllers, output controllers, shared buffers, and switches S1 and S2. It is also necessary to understand the content and format of the data carrying packets as well as the content and format of control information carrying packets.
Description of Packet Formats and Layouts The data packets entering the system are decomposed into segments and further decomposed into flits. These flits move through system and are reassembled into segments, which in turn are reassembled into output message packets. The flits are directed from input ports to output ports through the switches S1 and S2. In addition to the message packets, there are a number of control information packets that are sent from location to location in the system. The control information packets do not travel through the switches S1 and S2. Prior to describing the components illustrated in system 200, the formats of the data carrying packets and control packets will be described.

Figure 4A:
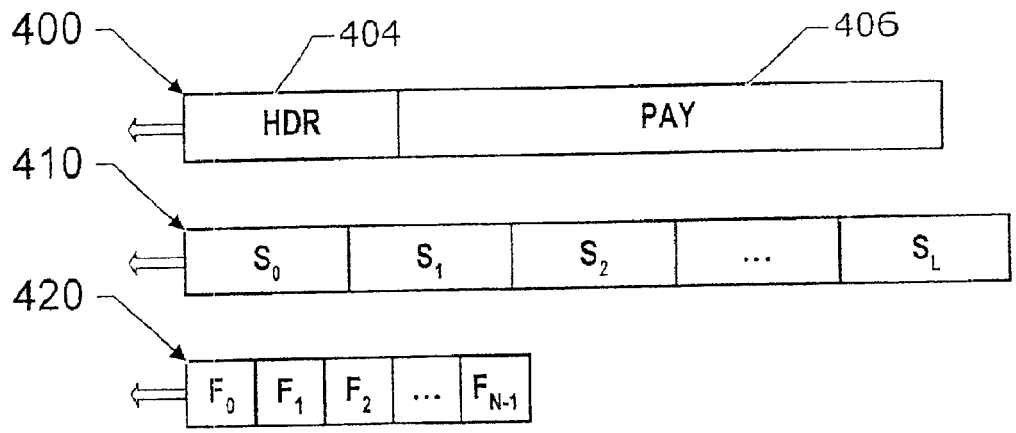
FIGS. 4A through 4G are diagrams showing formats of packets used in various components of the switching system.

FIG. 4A shows the format of a message packet as it is received by a line card and passed on to an input controller. A message packet consists of a header and a payload. FIG.

4A also shows how this message is decomposed into segments and flits. The message length determines the number L of associated segments. The message packet 400 is decomposed into segments $S_0, S_1, S_2, \ldots S_{L-1}$. Each segment $S_X$ in the segment sequence is further decomposed into N flits $F_0, F_1, \ldots F_{N-1}$. Each flit contains FL bits and each segment contains SL bits, where SL=N·FL.

FIGS. 4B to 4G show the structure of the various control packets referred to in this document. Following is a brief description of the fields within these control packets:

BIT—A one bit field set to one to indicate the presence of a packet. Changing BIT to zero will "erase" the packet.

MTA—The message target address, i.e. the destination output port of an incoming message packet. The MTA is derived from information in the incoming message packet header.

SA—The relative segment address for a set of flits in the shared buffer system.

SP—The segment priority, which is based on the quality of service (QOS) value in the header of the incoming message.

MPID—The message packet ID selected by the input controller to identify each segment of a given message packet.

EOM—An end of message indicator. A one bit field included in several control packets to indicate that a complete message packet has been processed. EOM is set to zero, unless the control packet is associated with the last segment for a message packet, in which case it is set to one.

IP—The number of the input port that sent the segment associated with the control packet.

OP—The number of the output port sending the control packet.

$NUM_X$—The number of segments having priority X.

Component and Timing Description

In order to have a complete understanding of the invention, it is necessary to have an in depth comprehension of: 1) the operation of the switches S1 and S2; 2) the operation of the input controllers; 3) the operation of the output controllers; 4) the construction and operation of the shared buffers; and 5) the timing of the system. Each of these topics will be discussed in a separate section. The input controllers and output controllers have functions that are similar to those of the input controllers and output controllers in patent 8. These interconnect controllers provided by the present invention and patent 8 make possible a level of intelligence not found elsewhere. This control is accomplished by simultaneously examining all of the messages targeted to a given output port and by using this information to route the data. The shared buffers constitute the novel shared memory and logic that are at the heart of the patent. A key aspect of the invention is the novel timing scheme. There is a global clock that drives the system. Message packets are decomposed into segments and segments are further decomposed into sub-segments referred to as flits. A flit consists of FL bits, and a segment consists of SL bits, where SL=N·FL. It requires T clock ticks to move a flit from one location to another. A global clock GC (not illustrated) initializes time to zero. This clocks steps sequentially to time N·T (the amount of time required to move a segment) then resets to zero. In this document, when it is stated that a certain event occurs at time t, it is implied that t is the setting of the global clock when the event occurs.

The Switches S1 and S2

A novel and important feature of the present invention is the presence of the data switches that are reset by a central clock rather than by a strategy that is data dependent. In the time interval [0, T], the switches S1 and S2 are set so that, during that time period, data traveling through S1 travels from $IC_K$ to $SB_K$ and data traveling through S2 travels from $SB_K$ to $ODB_K$. In the time interval [T, 2·T] data travels through S1 from $IC_K$ to $SB_{K+1}$ and data travels through $S_2$ from $SB_{K+1}$ to $ODB_K$. This switching pattern continues so that in the time interval [M·T, (M+1)·T] data travels through S1 from $IC_K$ to $SB_{K+M}$ and through S2 from $SB_{K+M}$ to $ODB_K$.

Input Controllers

Figure 1:
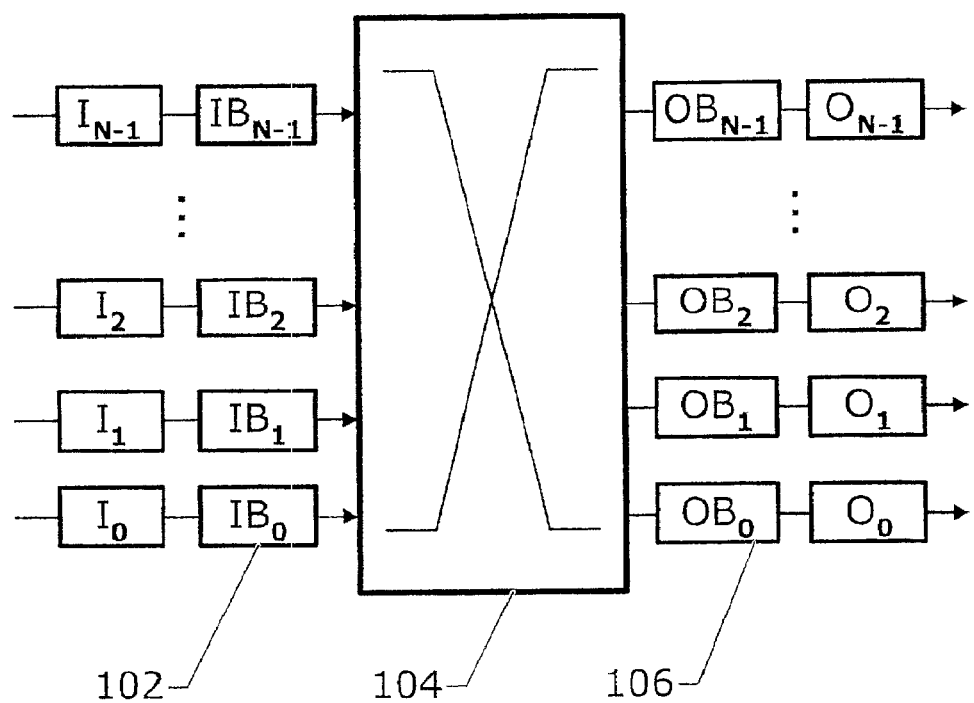
FIG. 1 is a schematic block diagram showing an example of a generic prior art switching system consisting of line cards, shared buffers, a switch fabric, and output buffers.
Figure 2:
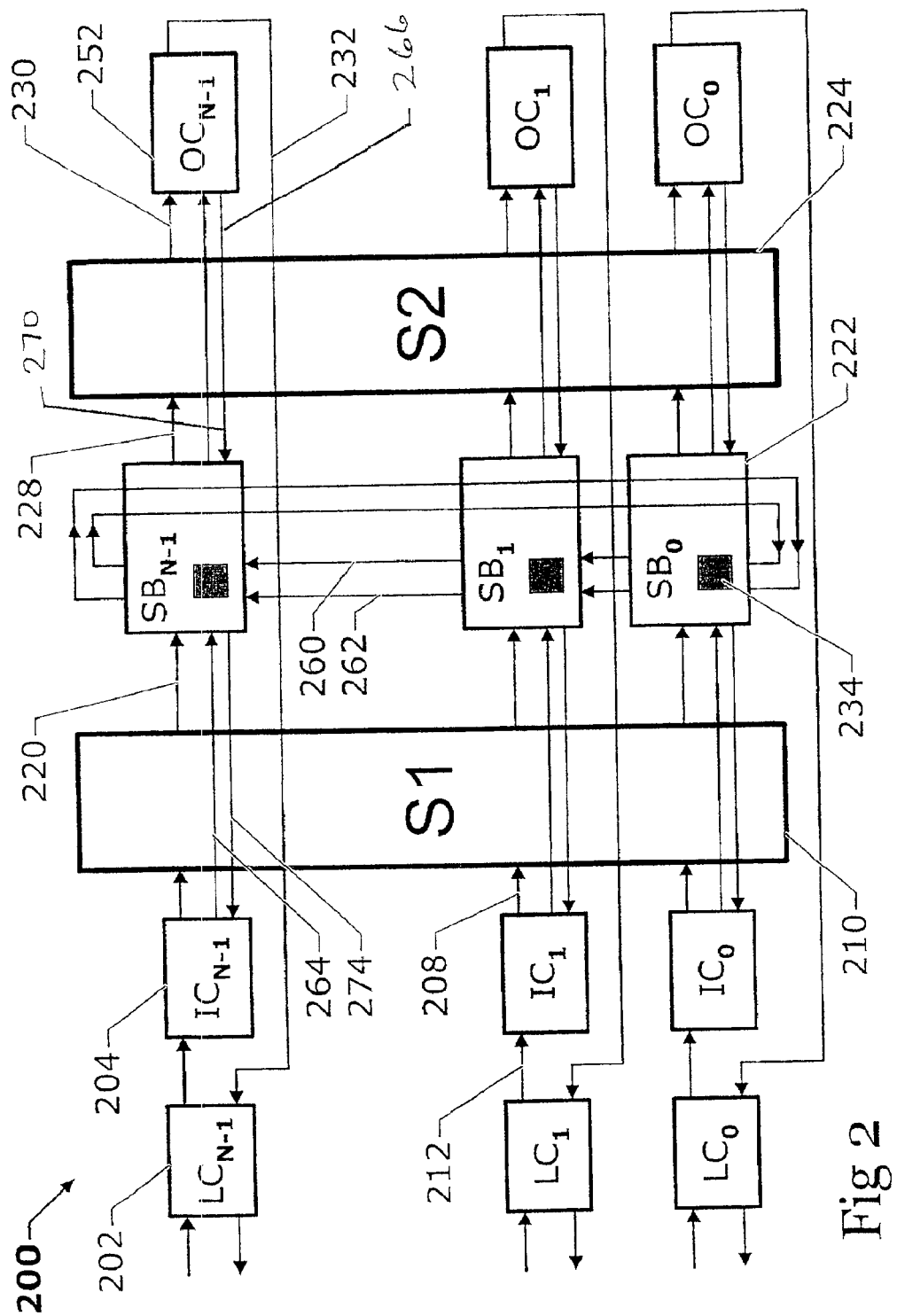
FIG. 2 is a schematic block diagram illustrating the intelligent shared memory switching system of the present invention. The system includes line cards, input controllers, an input switch S1, shared buffers, an output switch S2, and output controllers.
Figure 4B:
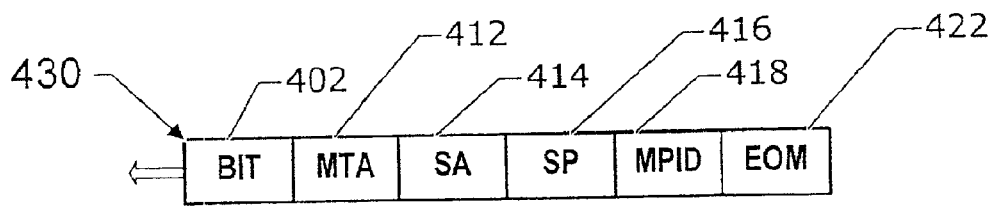
Figure 4C:
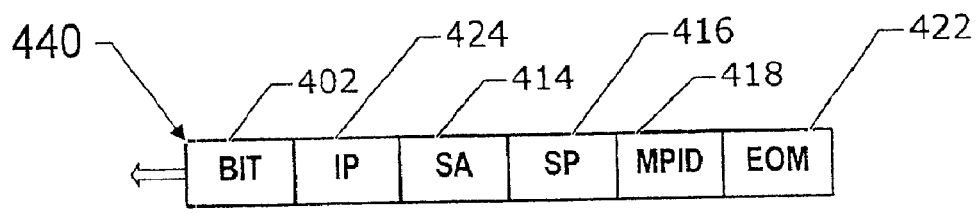
Figure 4D:
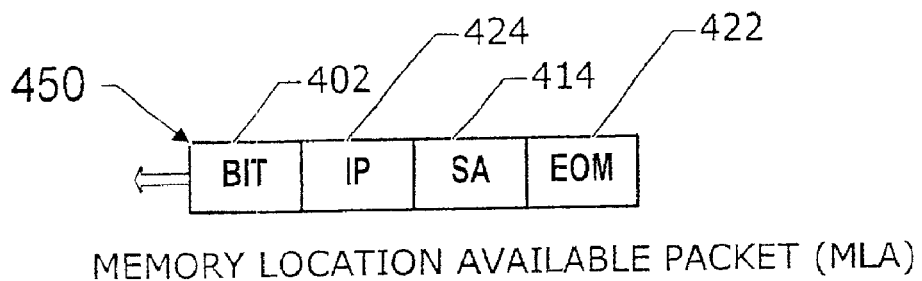

FIG. 2 depicts a switching system 200 with intelligent control. A message packet enters a line card $LC_K$ 202. The message packet can be one of a variety of formats including Ethernet, Internet Protocol, Sonnet Frame, and ATM. The line card $LC_K$ sends a message packet MP in the form of FIG. 4A to input controller $IC_K$. The packet MP consists of a header and a payload. The header contains information including the final destination of the message packet from which the message target address (MTA) is derived. This header also contains quality of service (QOS) information from which the segment priority SP is derived. FIG. 3 depicts the components of an input controller 204 consisting of an input controller logic ICL 310, an input data buffer IDB 320, a list of available shared buffer storage locations ASL 330, and a list of available message packet IDs AMID 340. The input controller $IC_K$ receives messages from a line card through interconnection line 212 and sends message flits to S1 through line 208. The input controller sends control information packets to $SB_K$ through line 264 and receives storage location available information from $SB_K$ thorough line 274. In response to the arrival of a message MP from the line card, the input controller $IC_K$ performs a number of tasks including the following:

The data in the message packet MP arriving at $IC_K$ (including the packet header information) is decomposed into message packet segments as illustrated in FIG. 4A. The segments are all of the same length SL. The number of segments depends upon the length of MP. The segments consist entirely of incoming data and do not have header information inserted by the switch system 200. Instead, required information needed to route messages through system 200 is placed in a separate control information packet CIP, as illustrated in FIG. 4B.

A segment S is decomposed into N sub-segments (flits) $F_0, F_1, \ldots F_{N-1}$ each of length FL as illustrated in FIG. 4A.

A segment address SA is chosen as a shared buffer storage location for the segment S. This address is taken from the list of available shared buffer memory locations stored in ASL.

A priority SP for the segment S is chosen. This priority value is based at least in part on the quality of service of the packet MP. The priority value may also depend upon other factors, including the other data in the shared buffers.

A unique message packet identifier MPID is chosen for the message MP from the AMID buffer. This message identifier is used by the output controllers in re-assembling the segments into a message packet.

The last field of each CIP is the end of message indicator EOM. This is a one bit field whose value is set to one to indicate that a given segment is the last segment of the packet and is set to zero otherwise. This bit alerts the output controller that the unique message packet identifier MPID is free to be reused for another packet.

A control information packet CIP containing the fields MTA, SA, SP, MPID, and EOM is constructed. The CIP packet is illustrated in FIG. 4B.

In the time interval [0, T], the flit $F_0$ of S is sent from $IC_K$ to $SB_K$ through line 208, switch S1 and line 220 and is stored in shared buffer $SB_K$ at segment address SA in flit memory bank $M_K$. In the time interval [T, 2T] the flit $F_1$ of S is sent through line 208, switch S1 and line 220 for storage in $SB_{K+1}$ at address SA of $M_K$. This process continues until in the time interval [(N−1)·T, N·T] the flit $F_{N-1}$ of S is sent to $SB_{K+N-1}$ for storage at address SA in $M_K$. The shared buffer subscripts are non-negative integers less than N because the addition is done mod N.

In time interval [−T, 0], CIP is sent on line 264 to location CM1 530 of $SB_K$ as illustrated in FIG. 5.

In each time interval [QT, (Q+1)·T], $IC_K$ examines a special location CM2 532 of $SB_K$ for an MLA packet. MLA contains an input port IP number, a segment address SA and an end of message flag EOM. If an MLA packet is present in CM2 (i.e. BIT=1) and IP is K, then the value of SA is in $M_K$. If such a value is present, then $IC_K$ adds the value of SA to its ASL and "erases" MLA by changing the first bit (BIT) to zero. In addition, if IP is K, $IC_K$ also checks to see if the EOM field is one. If so, $IC_K$ alters the AMID buffer to allow the reuse of MPID for another message packet. If no SA value is present or the value is in a buffer $M_L$ with L distinct from K, then $IC_K$ does not modify its ASL nor does it modify CM2.

In time interval [−T, 0], $IC_K$ sends SA (as a subfield of CIP) on line 264 to $SB_K$ to be used by the logic of $SB_K$ in the time interval [0, T] to route $F_0$ to its proper storage location. [−T, 0] is used to denote the last time interval in the previous cycle. Thus, in the T ticks immediately prior to sending $F_0$ to $SB_K$, the controller $IC_K$ sets up the storage location for $F_0$.

In any switching system a data overflow situation may occur, forcing message packets to be discarded. In a simple embodiment of this invention, two methods of selecting message packets for discarding may be employed: 1) A number MAX can be set such that each input controller and each output controller will discard any message segments that remains in the system longer than MAX cycles. And 2) If an input controller $IC_K$ receives a message packet from its line card and its input data buffer $IDB_K$ is nearly full, then $IC_K$ compares the priority of the incoming message packet with the set of unprocessed entries in $IDB_K$ with lowest priority. $IC_K$ then discards the packet having the lowest priority, either the incoming packet or one in its input data buffer. Note that an unprocessed entry is one that has been received by the input controller but has not yet had any of its segments sent to the shared buffer system.

In a first additional control embodiment, if an overflow condition arises at input controller $IC_K$ due to congestion at output port J, $IC_K$ can relieve this situation by increasing the priority of its message packets targeted for J. To do this, $IC_K$ creates a change priority packet $CP_K$ (illustrated in FIG. 4F) which specifies a message target address MTA of J, the message packet ID MPID of the packet to be changed, and the new priority SP for the packet. $IC_K$ updates the priority for any segments of the packet not yet sent and sends $CP_K$ via a control path (not shown) to the output controllers. $CP_K$ percolates through the shared buffer system using location CM3. In embodiments using change priority packets, there are additional lines from $IC_K$ to $SB_K$, from $SB_J$ to $OC_J$ and between shared buffers. Each output controller will examine $CP_K$, and $OC_J$ will note that $CP_K$ is directed to port J, while the other output controllers will ignore the packet. $OC_J$ will then change the priority for all of the segments of the specified message packet in its output controller buffer.

In a second additional control embodiment, an input controller $IC_K$ may also discard a partially processed message packet in order to avoid overflow. To do this, $IC_K$ sends a discard message packet $DM_K$ (see FIG. 4E) to the appropriate output controller via a control path (not shown) and discards whatever segments of this packet remain in $IDB_K$. The $DM_K$ packet percolates through the shared buffer system using location CM4. In embodiments using discard message packets, there are additional lines from $IC_K$ to $SB_K$, from $SB_J$ to $OC_J$ and between shared buffers. Each output controller $OC_J$ will read the $DM_K$ packet and ignore it if MTA is not J. If MTA is J, $OC_J$ will delete all segments associated with input port K and the MPID supplied, thus completing the deletion of the requested message packet.

Additionally, there may be error detection and possible error correction functions performed by the input controller.

Also, the input controller can send information through its corresponding line card (or in a separate line that does not pass through the line card) to the output port of an upstream device. This information indicates the status of the input port. The upstream devices could use this information to regulate the flow of data to the switch 200. The path of the control information between separate switches is not indicated in FIG. 2. This information can fan out upstream through the entire system.

Output Controllers

FIG. 6 illustrates the main components of an output controller. The output controller contains a logic unit OCL 610, an output data buffer ODB 650 and output control buffer OCB 620 that holds the output control packets (OCP). The OCP packets are built using information in the CIP packets. The logic unit takes the information in the OCP packets as input, and based on this information, it manages the flow of traffic from the shared buffers 222 to the output data buffers 650 and from the output data buffers to the line cards 202. Line 270 delivers CIP packets, and line 266 sends an MLA packet to notify an input controller that a memory location in the shared buffers is free. As in patent 8, an output controller is associated with a given output port (including, in this case, an output data buffer and a line card). The output controller examines all of the traffic that is targeted to its associated output port and controls the flow of data into the line card associated with that output port. The routing of messages based on the comparison of two or more messages at different input ports targeted for the same output port is a key feature of the present invention as well as patent 8. In order for this to be possible, it is necessary that the output controller $OC_J$ be informed of all of the traffic targeted for output port J. The information needed by the output controllers is contained in the control information packet CIP. In case a message packet MP targeted for line card $LC_J$ arrives from outside the system at line card $LC_K$, the input controller $IC_K$ segments the message and, corresponding to each message segment M, the input controller $IC_K$ constructs a control information packet CIP. During the last time interval of each cycle, $IC_K$ places CIP into the CM1 section of $SB_K$. In this manner, the input controller $IC_K$ writes to location CM1 of $SB_K$ in each cycle time interval of the form $[(N-1)\cdot T, N\cdot T]$ (often referred to as $[-T, 0]$ to emphasize that an event occurs in the last time interval of the cycle before its use). The output controller makes decisions based on the information that the input controllers place in the CM1 sections of the shared buffers.

The output controller $OC_J$ performs a number of functions including the following:

During the time interval $[T, 2\cdot T]$ the output controller $OC_J$ reads the control information packet CIP (inserted by input controller $IC_{J-1}$) from location CM1 of $SB_J$. During the time interval $[2\cdot T, 3\cdot T]$, the output controller $OC_J$ reads the CIP packet (inserted by input controller $IC_{J-2}$) from $SB_J$. This process continues so that in time interval $[(N-1)\cdot T, N\cdot T]$ the output controller $OC_J$ reads the CIP packet, which was inserted by $IC_{J-(N-1)}$, from location CM1 of $SB_J$. Note that $SB_{J-(N-1)}$ is $SB_{J+1}$.

Figure 4E:
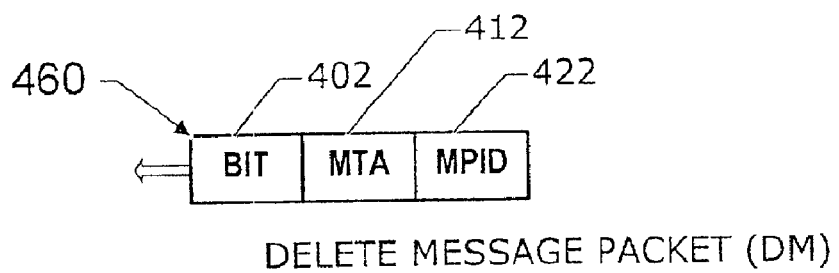
Figure 4F:
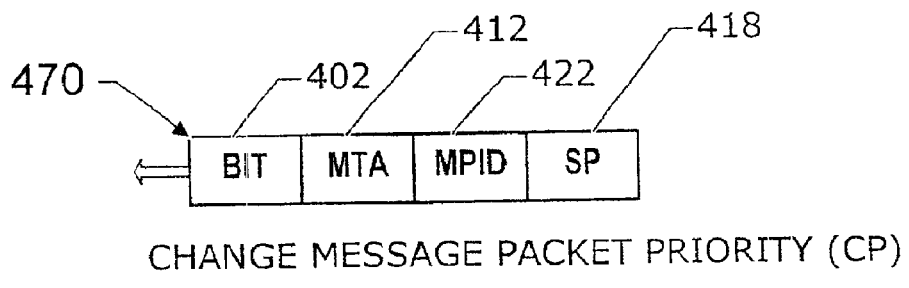
Figure 4G:
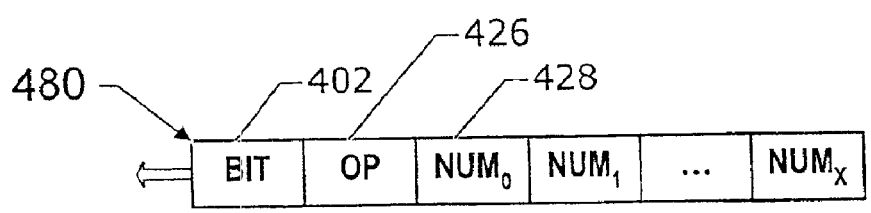

Each time $OC_J$ reads a control information packet CIP and the MTA field of CIP is J, $OC_J$ places information from CIP in an output control packet OCP of the type illustrated in FIG. 4E. The output controller then stores this OCP packet in the buffer OCB 620, and "erases" the CIP packet by changing the first bit (the traffic bit) to zero. In the simplest embodiment, $OC_J$ ignores control information packets whose message target address field is not J.

If at time $(N-3)\cdot T$ there are any control information packets in the OCB buffer of $OC_J$, then in the time interval $[(N-2)\cdot T, (N-1)\cdot T]$, the output controller $OC_J$ chooses one of the OCP packets OCP* and initiates a sequence of events associated with packet OCP*. As a consequence of the choice of OCP*, the segment associated with OCP* will be transferred from the shared buffers to $ODB_J$. In the simplest strategy, OCP* is associated with a segment of highest priority to be sent to $ODB_J$. The output controller causes the segments of a given message to be sent in order. In case there are two messages with the same highest priority, the output controller can base its choice on the time the segments entered the shared buffer.

In the time interval $[(N-1)\cdot T, N\cdot T]$, $OC_J$ creates an MLA packet, which contains the SA field of OCP*, and sends it through line 266 to the CM2 field of $SB_J$. Notice that because of the use of modular arithmetic, $[(N-1)\cdot T, N\cdot T]=[-T, 0]$. One purpose of this action is to cause the segment in location SA to be sent to $ODB_J$ during the next cycle. Recall that during this same time interval, $IC_J$ creates a CIP, which contains an SA field, and sends it to the CM1 field of $SB_J$.

In the time interval $[-T, 0]$, $OC_J$ sends the values of K and SA in an MLA packet (illustrated in FIG. 4F) to the CM2 field of $SB_J$, where K is the subscript of the input controller whose message is being processed. The purpose of this action is to allow $IC_K$ to free up this space in its ASL for another message segment.

In some embodiments of this invention, an output controller $OC_J$ sends status information to all of the input controllers. There are four types of status information that $OC_J$ can send to the input controllers. The information is sent in an output port status packet $OPS_J$ (see FIG. 4G). The first type of information is a sequence of numbers $NUM_0, NUM_1, \ldots NUM_L$, where $NUM_X$ gives the number of message segments in $OCB_J$ having priority X. The second type of information that the output controller can send may contain information (not illustrated in FIG. 4G) about the number of message segments of various priorities in the shared buffer that are targeted for $OC_J$. The second type of information can be included in the $OPS_J$ packet or sent in a separate control packet. A third type of information that an output controller can send is information that it has received from a down stream input port or downstream input port controller (usually one that receives data from the output port associated with $OC_J$). The third type of information can include the status of the downstream buffer or any other information that is useful to the network system management. This third type of information can be sent with the information of type one or type two or can be send in a separate packet. A fourth type of information that an output controller can send lists the number and priority of messages recently received by the output port. As before this information can be sent in a control packet with information of type one, two or three or it can be sent in a separate control packet. The fourth type of information indicates a likely busy condition of a down stream input port and is useful when the downstream input port does not send status information back to $OC_J$, or else it does not send this information back in a timely manner. An input controller can use this information to tell how busy each output port is and use this knowledge in selecting which segments to send. An output port status packet $OPS_J$ is sent via a control path (not shown) in the same manner as an MLA packet. Other possible control packets for information of type two, three, or four may require additional buffer locations and control lines, also not shown. $OPS_J$ and other possible output port status packets percolate through the shared buffer system using storage buffer locations CM5 and additional lines not shown. Thus each input controller will have an opportunity to read $OPS_J$ or other output port packets within N time intervals.

In an alternate embodiment, the output controller has the ability to discard packet segments in its buffer. In this case, the output controller generates an additional control packet to inform the input controllers of this action.

The information that the output controllers send back to the input controllers allow the input controllers to apply a level of control not possible without this information. In particular, information of type three from a downstream input port of a separate device can itself be based on information received from yet another separate device still further downstream. In this manner, information can travel upstream from switch to switch. This information can fan out upstream and can be used to give a new and novel level of control to the entire system.

Shared Buffers

The line cards send data packets to the input controllers. The input controllers send data through the switch S1 to the shared buffers. The shared buffers send data through S2 to the output data buffers. FIG. 5 is a detailed block diagram of a shared buffer 222. A system with N input ports has N shared buffers. Each of the N shared buffers contains a number of components including N flit memory banks $M_0$, $M_1, \ldots M_{N-1}$ 510; two control information storage areas CM1 530 and CM2 532; and a logic unit SBL 520. Memory bank $M_K$ is reserved for data that entered the system through input port K. Data in $M_K$ can be targeted for any output port. In some embodiments, the N memory banks are of equal size. In other embodiments, there is a memory manager that allocates different amounts of memory to different input ports. This feature is useful when some input ports are not connected to data lines or when different data lines receive data at unequal data rates. Associated with each flit memory bank $M_K$, there corresponds a list of addresses in $M_K$ that are not in use and are therefore available to store new data. This list of available addresses is stored in the ASL 330 memory unit in input controller $IC_K$. The storage location CM1 530 holds a single CIP packet that is inserted by the single input controller $IC_K$ and is read by all of the output controllers. The storage location CM2 532 holds a single free memory packet MLA indicating a free memory position in one of the flit memory banks in the sequence $M_0, M_1, \ldots M_{N-1}$ 510. CM2 receives its single data item from an output controller $OC_J$ that reads a data item originating from input controller $IC_K$. When $OC_J$ reads an item from location MP of $M_K$, then $OC_J$ indicates that position MP is free to hold new data by inserting the address MP into CM2. CM2 is read by all of the input controllers and is used by a single input controller $IC_K$. The shared buffer $SB_K$ is governed by a logic SBL 520 that receives control input from $SB_{K-1}$ through lines 260 and 262 and sends control output to $SB_{K+1}$ through lines 260 and 262. This logic unit controls the storage of data into $SB_K$ through line 220 and also controls the sending of data out line 228. The logic unit SBL 520 controls the flow of a segment from the switch S1 into the correct location SAI in the shared buffer data storage area. Logic unit SBL also controls the flow of data from the correct memory location SAO in the shared buffer to the output data buffers. These correct memory locations are passed to the shared buffer as SA packets.

The timing of the data and the control information is critical to the correct operation of the shared buffers. A flit of data arriving at a shared buffer $SB_L$ through line 220 is stored at a location that is determined by the SA field of a MLA packet that arrives on line 260. During the time interval [−T, 0] an input controller $IC_K$ scheduling flit $F_0$ arrival beginning at the next time 0 (the beginning of a segment sending cycle), sends a CIP packet containing segment address SA to $SB_K$ through line 264. This CIP packet is stored in location CM1. At time 0, the shared buffer internal memory switch is positioned to place the next arriving data (the flit $F_0$ arriving in time interval [0, T]) in memory location SA in memory bank $M_K$ of $SB_K$. During the time interval [0, T] while $F_0$ is arriving at storage location SA in memory bank $M_K$, $SB_K$ sends SA to $SB_{K+1}$ through line 260. This address is in place when the second flit $F_1$ arrives at $SB_{K+1}$ causing $F_1$ to be stored in address SA in memory bank $M_K$. This process continues with the proper storage addresses arriving at shared buffers on line 260 at the proper time to store the next flit of the message. When the entire segment is stored, a new address arrives at the shared buffer on line 264. In this way, the storage address for the first flit arrives on line 264 and the storage address for the remaining flits arrives on line 260.

Figure 7:
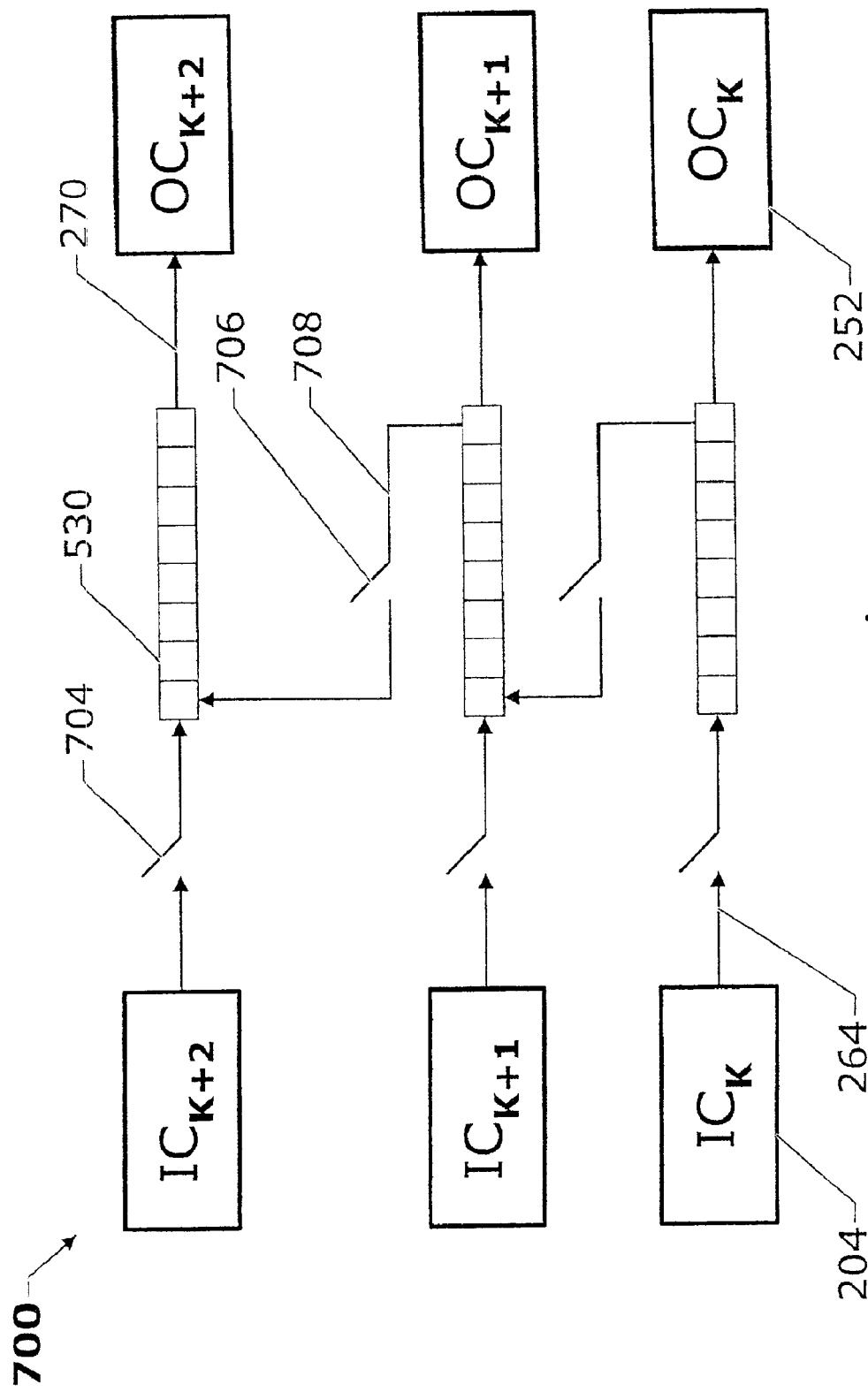
FIG. 7 is an illustration of the shift register that carries the CIP packet.

FIG. 7 is an illustration of one method of percolating the CIP packet up through the shared buffers. In this embodiment, CM1 is a shift register. During time [−T,0], switch 704 is closed and switch 706 is open so that a CIP packet flows from the input controller to the shift register CM1. During all other segment sending time intervals switch 704 is open and switch 706 is closed. During all time intervals, CIP packets shift into the output controllers. In this manner, the control packets percolate up through the shared buffers in a long shift register. In some embodiments, the bus is one wide as illustrated in FIG. 7; in other embodiments, a plurality of shift registers carry the data and the lines 264 and 270 are busses.

During the time interval [−2·T, −T], the output controller $OC_J$ determines which segment in the shared buffers will be sent to $ODB_J$ in the segment sending interval [0, N·T]. During the time interval [−T, 0], $OB_J$ sends MLA packet containing the address SA of the selected segment to shared buffer $SB_J$ through line 266. Thus at time 0, this address is in place in location CM2 of $SB_J$. During the time interval [0, T], $SB_J$ sends the flit in location SA to $ODB_J$. Also, during this same time interval, $SB_J$ sends MLA through line 262 to $SB_{J+1}$. Thus at time T, the address SA is in location CM2 of $SB_{J+1}$ so that $SB_{J+1}$ is able to send the flit in location SA through line 228 to $ODB_J$. This process continues until the entire segment is successfully sent from the shared buffers to the output data buffer $ODB_J$.

System Control

The input controllers manage the moving of data from the line cards to the shared data buffer. The output controllers manage the moving of data from the shared data buffer to the line cards. The management of the system is governed by logical units associated with the input controllers and the output controllers. For this logic to function effectively, it is necessary for control information to be passed between the input controllers and the output controllers. In the most basic system, an input controller places segments in the shared data space. Associated with this data, the input controller sends a control information packet to the output controller informing the output controller of the location of the segment and the segment priority. This information is contained in the control packet CIP which is located in shared buffer location CM1. The output controller becomes aware of all segments targeted for it and, based on priority of the segment, the output controller removes the packets with the highest priority from the shared buffer, reassembles the message packets from the segments and sends the message packets to the line cards as output from the system. When the output controller removes data from the shared buffer space, it must inform the input controller of the freed up space in the shared buffer. This is done using the control packet MLA which is stored in shared buffer location CM2.

When several buffers send data to the same output port, the system can become congested. There are a number of methods of managing the congestion.

In a first method, (method 1) when an input controller's shared buffer space becomes full (or nearly full) and the input controller's input data buffer also becomes full (or nearly full), and the input controller receives new data, the input controller can discard the new data ND or replace old data OD in its input data buffer with ND. This replacement is done when OD represents a complete message and the priority of ND is higher than OD and ND fits in the space previously occupied by OD. In this method, since the old data is never placed in the shared buffer, there is no need to pass control information based on method 1 operation.

In a second method, (method 2) message packets placed in the shared buffer space are allowed to occupy that space for a fixed amount of time. At the end of that time, all segments of the message packet are discarded. The discarded message packet may have some segments in the input controller buffer, several segments in the output controller buffer and several segments in the shared buffers. There is no need to pass control information between the input controller and the output controller when aged messages are discarded. This is because both the input controller and the output controller are aware of all of the data (and the age of that data) in their own buffers and in the shared buffer.

In an optional third method, (method 3) when an input controller's shared buffer space becomes full (or nearly full)

and the input controller's input data buffer also becomes full (or nearly full), and the input controller receives new data, the input controller can free up shared buffer data space by discarding a message packet M already in the shared buffer. When this is done, all segments of M (in the input controller buffer, the shared data buffers, and the output controller data buffer) must be discarded. Because the input controller assigned an SA to each segment of a message packet and is informed by MLA packets of segments removed from the shared buffers, the input controller can keep track (in a memory location not illustrated) of where all of the segments of a message packet are located. When data is discarded using method 3, the input controller must inform the output controller of the action. This is accomplished by sending a DM control packet to the output controller. This packet is stored in the shared buffer in location CM4 (not illustrated).

In an optional fourth method, as the input controller buffer becomes full and the input controller's shared buffer space becomes full, the input controller can raise the priority of message packets in the shared buffer space. In order to do this, the input controller must inform the target output controller of the new priority of the packet. This information is contained in packet CP which is stored in shared buffer location CM3 (not illustrated).

The output controllers can assist the input controllers in making the proper logical decisions when applying methods three and four. This is accomplished by each output controller informing all the input controllers of all of the message packets (and their priority) in the shared buffer space targeted to the given output controller. This information is passed in control packet OPS and is located in shared buffer space location CM5 (not illustrated).

System Timing

As previously discussed, timing is controlled by a system global clock GC (not illustrated). The basic clock time unit is called a tick, and T is used to denote the number of ticks required to send one flit of data from one location to another, e.g. from an input controller to a shared buffer through line 208, switch S1 and line 220 or from a shared buffer to an output buffer through line 228, switch S2 and line 230. Since a segment is composed of N flits, it follows that it would take N·T clock ticks to move a segment from one location to another. With this in mind, the global clock GC is designed so that it repeats time cycles of length N·T by first initializing itself to zero, ticking sequentially until time N·T, and then resetting itself to zero. The clock cycle is segmented into the N·T time intervals $[0, T], [T, 2 \cdot T], \ldots [(N-1)T, N \cdot T]$.

Timing for the system will be described by discussing the flow of data from location to location during one clock cycle $[0, N \cdot T]$. There are two main processes that take place during a clock cycle: 1) A segment insertion process in which message segment flits are sent from one or more input controllers to the set of shared buffers; and 2) A segment retrieval process in which one or more output controllers direct the sending of flits from the set of shared buffers to their respective output data buffers for reassembly into message segments. While these two processes happen concurrently, they will be discussed separately for the sake of clarity. Refer to Table 1 for details of data flow in each time interval.

Segment Insertion Process

During the time interval $[-2 \cdot T, -T]$ of each clock cycle, each input controller finalizes the selection of a message segment to be sent in the next clock cycle. In the last time interval $[-T, 0]$ each input controller $IC_K$ having a message segment ready for sending in the next cycle sends the control information packet $CIP_K$ for that segment through line 264 to the shared buffer $SB_K$, where it is stored in CM1. Note that $CIP_K$ contains the segment address $SA_K$ as a subfield. Thus $SB_K$ has the address for storing the first flit $F_0$ of data when it arrives in time interval $[0, T]$ of the next clock cycle.

In time interval $[0, T]$ three events occur: 1) Each input controller $IC_K$ that is sending a message segment in this cycle sends the first flit $F_0$ via line 208, switch S1 and line 220 to shared buffer $SB_K$ for storage at address $SA_K$ in $M_K$. 2) The control information packet $CIP_K$ is moved from $SB_K$ via line 260 to the CM1 field of $SB_{K+1}$. Thus $SA_K$ is in place for loading the next flit in $SB_{K+1}$. 3) $IC_K$ checks the CM2 field of $SB_K$ via line 274 for a memory location available packet MLA. As will be discussed in the Segment Retrieval Process, the MLA found in $SB_K$ during time interval $[0, T]$ was put there by $OC_K$ during time interval $[-T, 0]$, and thus can be ignored by $IC_K$, since $IC_K$ does not send data to output port K.

In the second time interval $[T, 2 \cdot T]$ similar events take place: 1) Each input controller $IC_K$ processing a message segment sends the second flit $F_1$ via line 208, switch S1 and line 220 to $SB_{K+1}$. $F_1$ is stored at address $SA_K$ in $M_K$ of $SB_{K+1}$. 2) The control packet $CIP_K$ (containing $SA_K$) is moved from $SB_{K+1}$ via line 260 to the CM1 field of $SB_{K+2}$. And 3) $IC_K$ checks the CM2 field of $SB_K$ via line 274 for a memory location available packet MLA. If $IC_K$ finds that the input port value IP in MLA is K, then the value of SA in MLA belongs to $IC_K$'s available storage location buffer ASL. $IC_K$ then frees that location for future use and "erases" the MLA packet by changing the first bit (the traffic bit) to zero. If IP is not K, $IC_K$ ignores MLA. Data is placed in CM2 by an output controller $IC_J$ during the Segment Retrieval Processed, which is discussed in the next section. At the second time interval the MLA found in $SB_K$ was initially sent to the shared buffer $SB_{K-1}$ by output controller K-1 during time interval $[-T, 0]$. Thus Table 1 uses $MLA_{K-1}$ to denote this value.

From time interval $[2 \cdot T, 3 \cdot T]$ to $[(N-2) \cdot T, (N-1) \cdot T]$ the process begun in the second time interval continues. Thus, in time interval N-1 the following happens: 1) $IC_K$ sends flit $F_{N-2}$ via 208, S1, and 220 to $SB_{K+(N-2)}$. 2) $SB_{K+(N-2)}$ sends $CIP_K$ via 260 to $SB_{K+(N-1)}$. Note that $SB_{K+(N-1)}$ is $SB_{K-1}$, and thus $CIP_K$ has now been sent to each of the shared buffers. 3) $IC_K$ checks $SB_K$ via 274 for an MLA packet freeing a value in its ASL. $SB_K$ now contains the value $MLA_{K-(N-2)}$ that was put in $SB_{K-(N-2)}$ in time interval $[-T, 0]$ by $IC_{K-(N-2)}$. One additional process takes place only in each cycle time interval of the form $[(N-2) \cdot T, (N-1) \cdot T]$: $IC_K$ completes the decision on which new message segment to process in the next clock cycle, selects an address $SA_{K^*}$ from its ASL, and builds a control information packet $CIP_{K^*}$ for this segment.

In the last time interval of the cycle $[(N-1) \cdot T, N \cdot T]$, the following occurs: 1) $IC_K$ sends the last flit $F_{N-1}$ of the message segment via 208, S1, and 220 to $SB_{K+(N-1)}$. 2) $IC_K$ sends $CIP_{K^*}$ via 264 to $SB_K$, which preloads $SA_{K^*}$ in preparation for the next cycle. And 3) $IC_K$ checks $SB_K$ via 274 for an MLA packet that frees an address that lies in its ASL. $SB_K$ now contains the value $MLA_{K-(N-1)}$. At this point $IC_K$ has now checked each $MLA_J$ placed into $SB_J$ by $OC_J$ during the last time interval of the previous cycle, provided that J is not K.

Segment Retrieval Process

The process of retrieving segments from the shared buffers and sending them to the output controllers for reassembly and shipping to the line cards is similar to and runs concurrently with the insertion process. It also begins in the time interval $[-2 \cdot T, -T]$ of the previous cycle. Each output controller $OC_J$ having data to process in the next cycle finalizes the selection of an entry from its output control buffer OCB and builds a memory location available packet $MLA_J$ for it. $MLA_J$ contains both the number of the input port IP that sent the segment and the relative address $SA_J$ where flits of the segment are stored in the set of shared buffers SB.

In the time interval $[-T, 0]$, each output controller $OC_J$ processing data in the next cycle preloads its $MLA_J$ packet via line 266 into the CM2 field in $SB_J$.

In time interval $[0, T]$ three events take place: 1) Shared buffer $SB_J$ retrieves flit $F_P$ from its buffers using the address $SA_J$ (which was preloaded in CM2 as part of $MLA_J$) and sends $F_P$ via line 228, switch S2 and line 230 to the output data buffer $ODB_J$. 2) $SB_J$ sends the memory location available packet $MLA_J$ (which contains $SA_J$) via line 266 to $SB_{J+1}$ to be stored in field CM2. And 3) Output controller $OC_J$ checks the CM1 field of $SB_J$ via line 270 for the control information packet $CIP_K$. Note that the Segment Insertion Process describes how a control information packet $CIP_K$ is inserted by $IC_K$ into shared buffer $SB_K$ at interval $[-T, 0]$ and sequentially rotated through the remaining shared buffers $SB_{K+1}$, $SB_{K+2}$, ..., $SB_{N-1}$ in successive time intervals. Consequently, the CIP in CM1 at time $[0, T]$ was inserted there by $IC_J$ and will be ignored since $IC_J$ does not send data to output port J.

In time interval $[T, 2 \cdot T]$ similar events occur: 1) $SB_{J+1}$ retrieves flit $F_{P+1}$ using the value of $SA_J$ passed to it as part of $MLA_J$ in the previous time interval and sends it via line 228, switch S2 and line 230 to $ODB_J$. 2) $SB_J$ sends $MLA_J$ via line 268 to $SB_{J+1}$. And 3) $OC_J$ checks the CM1 field of $SB_J$ via line 270 for the control information packet $CIP_{J-1}$ (inserted by input controller $IC_{J-1}$ during $[-T, 0]$) to see if a new segment is being sent to output port J. If so, $OC_J$ builds an output control packet OCP from the information in $CIP_{J-1}$ and stores it in its ODB. $OC_J$ also "erases" $CIP_{J-1}$ by changing the first bit (the traffic bit) of the packet to zero. If the message target address MTA in $CIP_{J-1}$ is not J, then $OC_J$ ignores the packet.

The process begun in the second time interval continues through the (N−1)th time interval. Thus in $[(N-2) \cdot T, (N-1) \cdot T]$ (which is interval $[-2 \cdot T, -T]$ of the next cycle) the following happens: 1) $SB_{J+(n-2)}$ retrieves flit $F_{P+(N-2)}$ and sends it via line 228, switch S2 and line 230 to $ODB_J$ for storage at relative address $SA_J$. 2) $SB_{J+(N-2)}$ sends $MLA_J$ via line 268 to $SB_{J+(N-1)}$, thus completing the circuit of $MLA_J$ through all of the shared buffers. And 3) $OC_J$ checks the CM1 field of $SB_J$ via line 270 for $CIP_{J-(N-2)}$ to see if a new segment is being sent to output port J. Since this is the time interval $[-2 \cdot T, -T]$ relative to the next cycle, there is one additional process that takes place only in each interval having the form $[(N-2) \cdot T, (N-1) \cdot T]$: $OC_J$ completes selection of the segment to be retrieved in the next time cycle and builds an $MLA_{J^*}$ packet for this segment.

During the last time interval $[(N-1) \cdot T, N \cdot T]$ of the cycle (which is interval $[-T, 0]$ of the next cycle) the following occurs: 1) $SB_{J+(N-1)}$ retrieves the last flit $F_{N-1}$ of the segment and sends it via line 228, switch S2 and line 230 to $ODB_J$ for reassembly. 2) $OC_J$ preloads $MLA_{J^*}$ via line 266 into $ODB_J$. And 4) $OC_J$ checks $SB_J$ via line 270 for $CIP_{J-(N-1)}$, which would have been sent by $IC_{J+1}$. Thus, during the cycle $OC_J$ has examined every CIP submitted by the set of input controllers that inserted new segments at time interval $[0, T]$.

Banyan Switch Embodiment

Figure 8A:
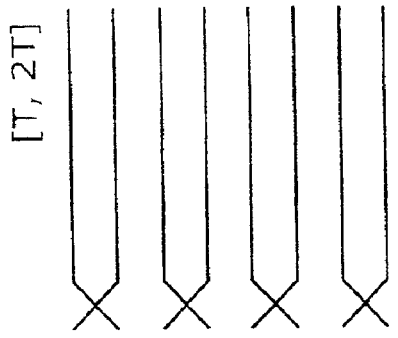
FIG. 8 is an illustration of a Banyan switch that is a suitable design for use as S1 or S2.
Figure 8B:
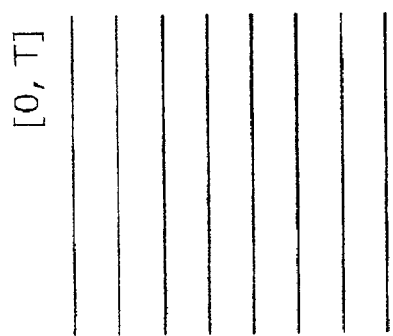
Figure 8C:
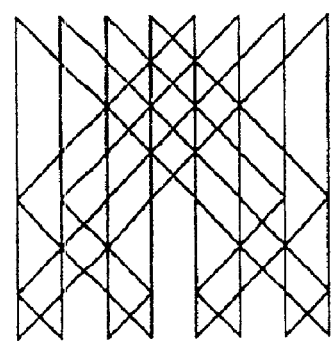
Figure 8D:
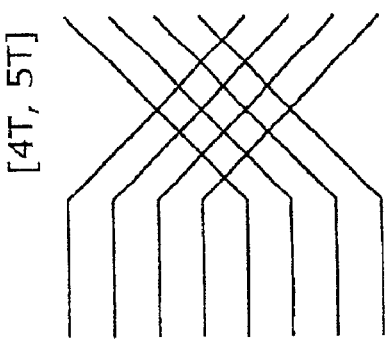
Figure 8E:
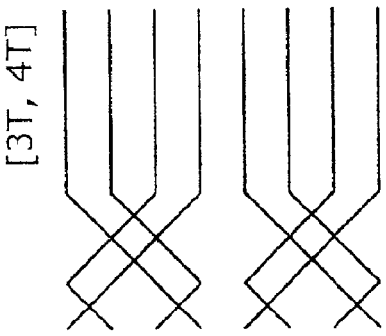
Figure 8F:
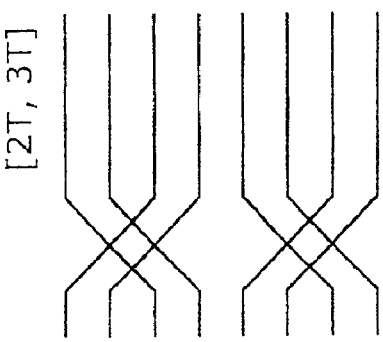
Figure 8I:
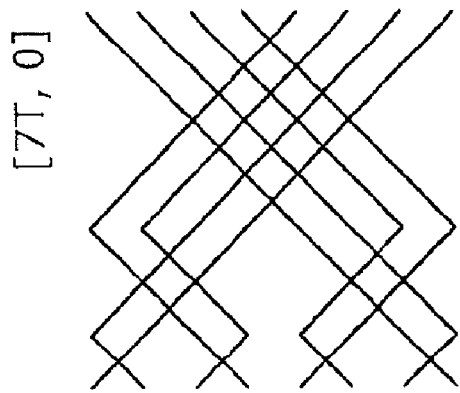
Figure 8H:
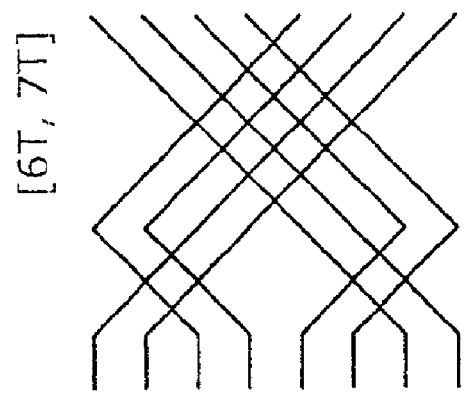
Figure 8G:
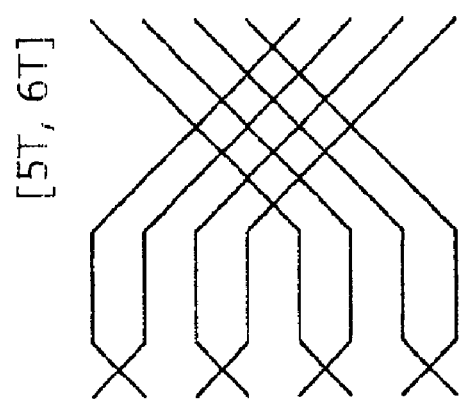

In another embodiment, the switches S1 and S2 are banyan switches. An 8×8 banyan switch is illustrated in FIG. 8A. When the banyan switches are employed, there is a simple algorithm for effectively switching them. In the time interval $[0, T]$, the banyan switch is set to the all bar position as illustrated in FIG. 8B. In the time interval $[T, 2 \cdot T]$, the first level of the switch is set in the cross position and the other levels are set in the bar position as illustrated in FIG. 8C. In the time interval $[2 \cdot T, 3 \cdot T]$, the first level switches are set in the bar position, the second level switches are set in the cross position and all other switches are set in the bar position. The eight settings of the switches are illustrated in FIGS. 8B to 8I. In general, for banyan switches of size $2^N \times 2^N$, the switches are all set to the bar position for the first time interval. The first level switches are switched for each new time interval. The second level switches are switched every other time. On the next level, the switches are switched every fourth time. This process continues so that on level K, the switches are switched every $2^{K-1}$-th time. By this process, S1 puts one flit of a message segment in each of the shared buffers and S2 removes one flit of a message segment from each of the shared buffers. The removed segments are not in order. For this reason, in the banyan switch embodiment the output processors have a bit more work to do when reassembling the flits into a segment. The advantage of the banyan network over the crossbar network is that there are only $N \cdot \log_2(N)$ switches in a banyan network compared to $N^2$ switches in a crossbar network.

A Switch with Trunk Output Lines

Figure 9:
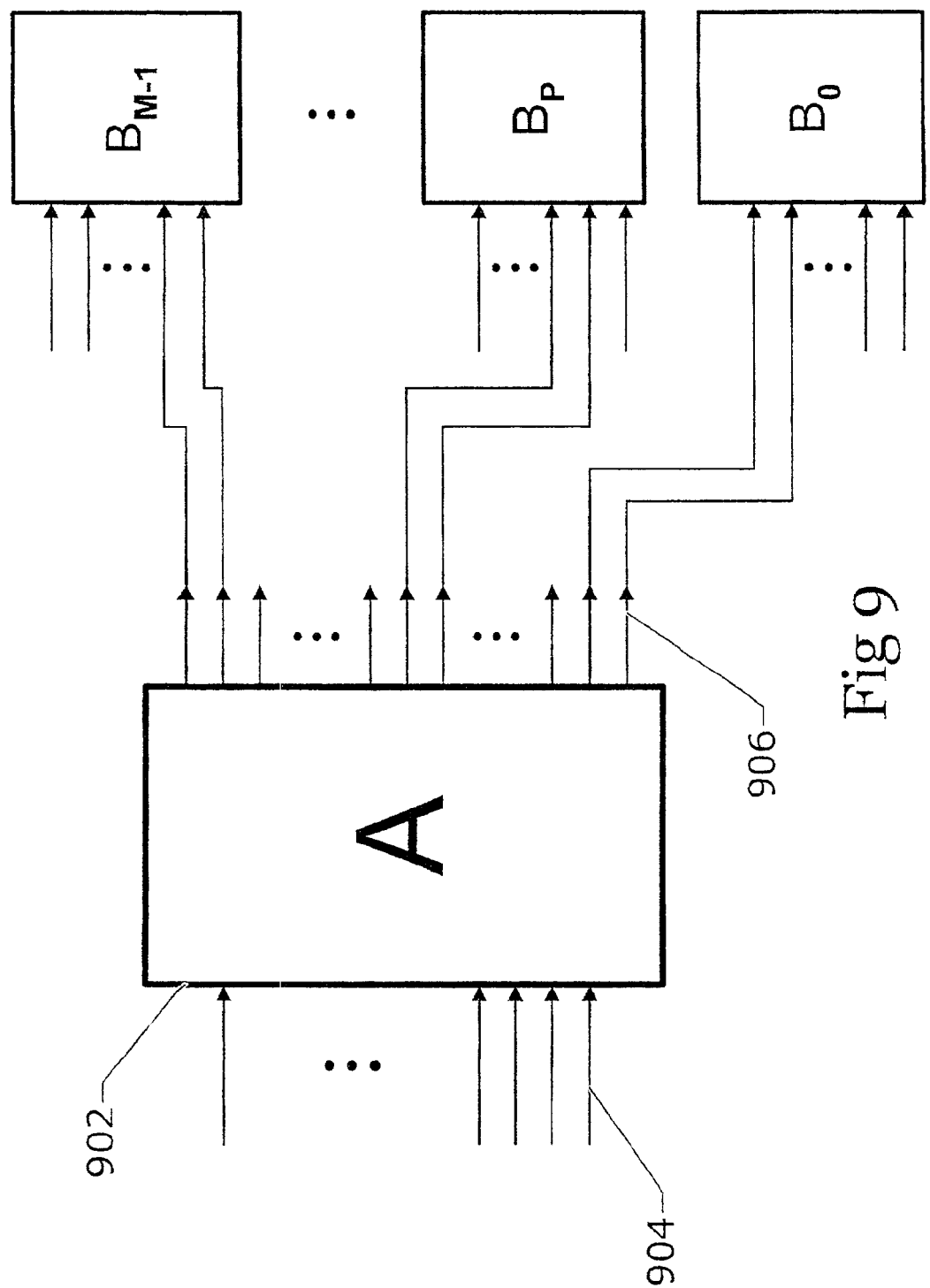
FIG. 9 is an illustration of a switch A with multiple output lines to switches $B_0$, $B_1$, ..., $B_P$, ..., $B_{M-1}$.

FIG. 9 is an illustration of a configuration of devices with a device A 902 with multiple input lines 904 and multiple output lines 906 to a plurality of devices $B_0, B_1, \ldots, B_{M-1}$. The devices $B_0, B_1, \ldots, B_{M-1}$ have additional input lines from devices distinct from A. In one embodiment, the devices $B_0, B_1, \ldots, B_{M-1}$ are also switches. The switch A may be of the type illustrated in FIG. 2, or it may be of another construction. For example the switch A can be of a type described in the incorporated patents. Of particular interest is the case where A is a switching system of the type described in patents 8 and 9. The data through the plurality of lines from switch A to device $B_P$ can be controlled by the input controllers in a number of ways. There are J data lines from switch A to device $B_P$, which are denoted by $L_0, L_1, \ldots, L_{J-1}$. As in FIG. 2, switch A has N input controllers $IC_0, IC_1, \ldots, IC_{N-1}$. When a data packet DP targeted for $B_P$ arrives at switch A input controller $IC_K$, the input controller $IC_K$ chooses which of the J transmission lines $L_0, L_1, \ldots, L_{J-1}$ to use for sending DP. The proper choice of the data line keeps the inputs to $B_P$ from receiving unbalanced loads, and importantly, keeps the inputs of $B_P$ from being forced to discard a high QOS message.

In another setting, a plurality G of devices in $B_0, \ldots, B_{M-1}$ are positioned to send data to a destination D, where D is itself a device or a collection of devices. In this setting, the transmission lines $L_0, L_1, \ldots, L_{J-1}$ are all capable of carrying data either directly or indirectly to the destination D. Therefore, as in the first setting, a message M that arrives at A and is targeted for D can reach D through any of the transmission lines $L_0, L_1, \ldots, L_{J-1}$. Once again, the input controller chooses one of the transmission lines $L_0, L_1, \ldots, L_{J-1}$.

In a first embodiment, the input controller utilizes a simple strategy of sending a nearly equal volume of data through each of the lines and also sending a nearly equal volume of high QOS data through each of the lines. In order to carry out this strategy, the input controller must keep a record of recently sent data. While this minimal strategy is preferable to no strategy at all, there can still be a problem of overloading a trunk when an input controller does not base its decisions on the state of the output ports leading the J trunk lines to $B_P$.

In a second embodiment, the input controller uses a technique taught in patents 9 and 10. In this embodiment, the input controller requests permission of an output controller associated with a particular line to B to send a message. This strategy can be used in conjunction with the strategy in the first embodiment. That is to say, the input controller chooses a line that it has not recently been used and makes a request to an output controller associated with that line.

In a third embodiment, the input controller chooses an output port based on status information of all of the output ports associated with the lines to $B_P$. One method of knowing this status is by receiving output port status information. This invention describes this status information as being passed in the control packet OPS. Based on the output port status, the input port sends the data to an output port having a small queue of messages waiting to be sent.

TABLE 1

Timing Chart

| Time Interval | Origin | Data | Via | To | Location |
|---|---|---|---|---|---|
| Previous Cycle (Only certain key transactions are shown.): | | | | | |
| $[-2 \cdot T, -T]$: | $IC_K$ selects next segment and builds $CIP_K$ | | | | |
| | $OC_J$ selects next segment and builds $MLA_J$ | | | | |
| $[-T, 0]$ | $IC_K$ | $CIP_K$ | 264 | $SB_K$ | CM1 |
| | $IC_K$ | $DM_K$ | | $SB_K$ | CM3 |
| | $IC_K$ | $CP_K$ | | $SB_K$ | CM4 |
| | ... | | | | |
| | $OC_J$ | $MLA_J$ | 266 | $SB_J$ | CM2 |
| | $OC_J$ | $OPS_J$ | | $SB_J$ | CM5 |
| Current Cycle: | | | | | |
| $[0, T]$ | $IC_K$ | $F_0$ | 208/S1/220 | $SB_K$ | $SA_K(M_K)$ |
| | $SB_K$ | $CIP_K$ | 260 | $SB_{K+1}$ | CM1 |
| | $SB_K$ | $DM_K$ | | $SB_{K+1}$ | CM3 |
| | $SB_K$ | $CP_K$ | | $SB_{K+1}$ | CM4 |
| | $SB_K$ | $MLA_K$ | 274 | $IC_K$ | n/a |
| | $SB_K$ | $OPS_K$ | | $IC_K$ | n/a |
| | ... | | | | |
| | $SB_J$ | $F_P$ | 228/S2/230 | $ODB_J$ | n/a |
| | $SB_J$ | $MLA_J$ | 262 | $SB_{J+1}$ | CM2 |
| | $SB_J$ | $OPS_J$ | | $SB_{J+1}$ | CM5 |
| | $SB_J$ | $CIP_J$ | 270 | $OC_J$ | n/a |
| | $SB_J$ | $DM_J$ | | $OC_J$ | n/a |
| | $SB_J$ | $CP_J$ | | $OC_J$ | n/a |
| $[T, 2 \cdot T]$ | $IC_K$ | $F_1$ | 208/S1/220 | $SB_{K+1}$ | $SA_K(M_K)$ |
| | $SB_{K+1}$ | $CIP_K$ | 260 | $SB_{K+2}$ | CM1 |
| | $SB_{K+1}$ | $DM_K$ | | $SB_{K+2}$ | CM3 |
| | $SB_{K+1}$ | $CP_K$ | | $SB_{K+2}$ | CM4 |
| | $SB_K$ | $MLA_{K-1}$ | 274 | $IC_K$ | n/a |
| | $SB_K$ | $OPS_{K-1}$ | | $IC_K$ | n/a |
| | ... | | | | |
| | $SB_{J+1}$ | $F_{P+1}$ | 228/S2/230 | $ODB_J$ | n/a |
| | $SB_{J+1}$ | $MLA_J$ | 262 | $SB_{J+2}$ | CM2 |
| | $SB_{J+1}$ | $OPS_J$ | | $SB_{J+2}$ | CM5 |
| | $SB_J$ | $CIP_{J-1}$ | 270 | $OC_J$ | n/a |
| | $SB_J$ | $DM_{J-1}$ | | $OC_J$ | n/a |
| | $SB_J$ | $CP_{J-1}$ | | $OC_J$ | n/a |
| ... | ... | ... | ... | ... | ... |
| $[(N-2) \cdot T, (N-1) \cdot T]$ | $IC_K$ | $F_{N-2}$ | 208/S1/220 | $SB_{K+(N-2)}$ | $SA_K(M_K)$ |
| | $SB_{K+(N-2)}$ | $CIP_K$ | 260 | $SB_{K+(N-1)}$ | CM1 |
| | $SB_{K+(N-2)}$ | $DM_K$ | | $SB_{K+(N-1)}$ | CM3 |
| | $SB_{K+(N-2)}$ | $CP_K$ | | $SB_{K+(N-1)}$ | CM4 |
| | $SB_K$ | $MLA_{K-(N-2)}$ | 274 | $IC_K$ | n/a |
| | $SB_K$ | $OPS_{K-(N-2)}$ | | $IC_K$ | n/a |
| $[-2 \cdot T, -T]$ | $IC_K$ selects next segment and builds $CIP_{K^*}$. | | | | |
| | ... | | | | |
| | $SB_{J+(N-2)}$ | $F_{P+(N-2)}$ | 228/S2/230 | $ODB_J$ | n/a |
| | $SB_{J+(N-2)}$ | $MLA_J$ | 262 | $SB_{J+(N-1)}$ | CM2 |
| | $SB_{J+(N-2)}$ | $OPS_J$ | | $SB_{J+(N-1)}$ | CM5 |
| | $SB_J$ | $CIP_{J-(N-2)}$ | 270 | $OC_J$ | n/a |
| | $SB_J$ | $DM_{J-(N-2)}$ | | $OC_J$ | n/a |
| | $SB_J$ | $CP_{J-(N-2)}$ | | $OC_J$ | n/a |
| $[-2 \cdot T, -T]$ | $OC_J$ selects next segment and builds $MLA_{J^*}$. | | | | |
| $[(N-1) \cdot T, N \cdot T]$ | $IC_K$ | $F_{N-1}$ | 208/S1/220 | $SB_{K+(N-1)}$ | $SA_K(M_K)$ |
| $[-T, 0]$ | $IC_K$ | $CIP_{K^*}$ | 264 | $SB_K$ | CM1 |
| | $IC_K$ | $DM_{K^*}$ | | $SB_K$ | CM3 |
| | $IC_K$ | $CP_{K^*}$ | | $SB_K$ | CM4 |
| | $SB_K$ | $MLA_{K-(N-1)}$ | 274 | $IC_K$ | n/a |
| | $SB_K$ | $OPS_{K-(N-1)}$ | | $IC_K$ | n/a |
| | ... | | | | |
| | $SB_{J+(N-1)}$ | $F_{P+(N-1)}$ | 228/S2/230 | $ODB_J$ | n/a |

TABLE 1-continued

Timing Chart

| Time Interval | Origin | Data Via | To | Location |
|---|---|---|---|---|
| [−T, 0] | $OC_J$ | $MLA_J$. | 266 | $SB_J$ | CM2 |
| | $OC_J$ | $OPS_J$. | | $SB_J$ | CM5 |
| | $SB_J$ | $CIP_{J-(N-1)}$ | 270 | $OC_J$ | n/a |
| | $SB_J$ | $DM_{J-(N-1)}$ | | $OC_J$ | n/a |
| | $SB_J$ | $CP_{J-(N-1)}$ | | $OC_J$ | n/a |

Table 1 Timing Chart notes:
1. $IC_K$ represents a generic input controller inserting a message segment into the shared buffers; $OC_J$ represents a generic output controller retrieving a message segment from the shared buffers.
2. $CIP_{K*}$, $MLA_{J*}$, $DM_{K*}$, $CP_{K*}$, and $OPS_{J*}$ are loaded in the Nth time interval for use in the next cycle.
3. $[x \cdot T, (x + 1) \cdot T]$ is used as shorthand notation for $[(x + N) \bmod N \cdot T, (x + 1 + N) \bmod N \cdot T]$.
4. Negative values of T denote time intervals of the Previous Cycle (relative to their use).
5. This timing chart is for the crossbar switch embodiment, there is a different timing chart for the banyan switch embodiment.

We claim:

1. An interconnect structure comprising a plurality of input ports, a plurality of output ports, a switch $S_1$ and a plurality of shared buffers $SB_{N-1}$ so that a payload of a message M entering the interconnect structure through an input port in serial fashion passes through the switch $S_1$ in serial fashion and enters the shared buffers $SB_{N-1}$ in serial fashion with the switch $S_1$ delivering different portions of the payload of message M to different shared buffers $SB_{N-1}$ of the said plurality of shared buffers $SB_{N-1}$;

wherein a portion of the payload of a message $M_1$ is delivered to a shared buffer $SB_j$ at the same time that a portion of a message $M_2$ is delivered to a shared buffer $SB_k$, where each of J and K is an integer in the range 0 to N−1; and wherein the payload of message M is decomposed into flits with the flits passing through the switch $S_1$ in such a way that the flits enter the shared buffers $SB_{N-1}$ in round robin fashion.

2. An interconnect structure in accordance with claim 1, wherein a setting of the switch S1 is independent of a target output port of the message M.

3. An interconnect structure in accordance with claim 1 further comprising a switch $S_2$ wherein the payload of message M passes first through the switch $S_1$ then is placed in the plurality of shared buffers $SB_{N-1}$ then passes through switch $S_2$ to its target output port.

4. An interconnect structure in accordance with claim 3, wherein the message M passes through the switch $S_2$ in serial fashion.

5. A method of sending information through a plurality of separate devices in an interconnect structure comprising the steps of:

transmitting a message M in serial fashion from a plurality of input ports to a switch $S_1$ included within the interconnect structure, said message M including a payload segment;

accepting said message M at switch $S_1$ and delivering different portions of said payload segment from switch $S_1$ to different ones of a plurality of shared buffers $SB_{N-1}$ in serial fashion; and accepting said different portions of said payload segment at said shared buffers $SB_{N-1}$ and delivering said different portions of said payload segment to a predetermined output port;

wherein a portion of the payload segment of a message $M_1$ is delivered to a shared buffer $SB_j$ at the same time that a portion of the payload segment of a message $M_2$ is delivered to a shared buffer $SB_k$, where each of J and K is an integer in the range 0 to N−1; and wherein the payload segment of message M decomposing into flits, and passing the flits through switch $S_1$ in a manner such that the flits enter the shared buffers $SB_{N-1}$ in round robin fashion.

6. A method in accordance with claim 5 further including the step of passing the payload segment of message M from the plurality of shared buffers $SB_{N-1}$ to a switch S2 and from switch S2 to a predetermined output port.

* * * * *